(12) United States Patent
Kataoka et al.

(10) Patent No.: US 12,136,863 B2
(45) Date of Patent: Nov. 5, 2024

(54) ROTARY ELECTRIC MACHINE AND PUMP

(71) Applicant: NIDEC TOSOK CORPORATION, Kanagawa (JP)

(72) Inventors: Shigehiro Kataoka, Kanagawa (JP); Yoshiyuki Kobayashi, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 296 days.

(21) Appl. No.: 17/707,960

(22) Filed: Mar. 30, 2022

(65) Prior Publication Data
US 2022/0320941 A1    Oct. 6, 2022

(30) Foreign Application Priority Data
Mar. 31, 2021 (JP) ................................. 2021-059571

(51) Int. Cl.
*H02K 3/52* (2006.01)
*F04C 2/08* (2006.01)

(52) U.S. Cl.
CPC .............. *H02K 3/522* (2013.01); *F04C 2/08* (2013.01); *F04C 2240/30* (2013.01); *F04C 2240/40* (2013.01); *F04C 2240/803* (2013.01); *H02K 2203/09* (2013.01)

(58) Field of Classification Search
CPC .............. H02K 3/522; H02K 2203/03; H02K 2203/09; F04C 2/08; F04C 2240/30; F04C 2240/40; F04C 2240/803
See application file for complete search history.

(56) References Cited

U.S. PATENT DOCUMENTS

| | | | |
|---|---|---|---|
| 2019/0036409 A1* | 1/2019 | Kataoka | F04C 15/008 |
| 2019/0195349 A1* | 6/2019 | Kataoka | H02K 5/225 |
| 2019/0301468 A1* | 10/2019 | Kataoka | F04C 2/102 |
| 2019/0301596 A1* | 10/2019 | Kobayashi | F04C 13/001 |
| 2020/0014272 A1* | 1/2020 | Asahi | H02K 3/50 |
| 2020/0208631 A1* | 7/2020 | Kataoka | F04C 15/0057 |
| 2020/0232477 A1* | 7/2020 | Kataoka | F04D 29/528 |
| 2020/0309119 A1* | 10/2020 | Kataoka | H02K 11/33 |
| 2020/0313504 A1* | 10/2020 | Okochi | F04C 29/0085 |
| 2020/0313505 A1* | 10/2020 | Kobayashi | H02K 11/33 |

FOREIGN PATENT DOCUMENTS

| | | | | |
|---|---|---|---|---|
| CN | 1941550 A | * | 4/2007 | H02K 11/33 |
| CN | 101791974 A | * | 8/2010 | H02K 11/33 |
| WO | WO-2018211726 A1 | * | 11/2018 | H02K 11/33 |

* cited by examiner

*Primary Examiner* — Alexander B Comley
(74) *Attorney, Agent, or Firm* — HAUPTMAN HAM, LLP (57) ABSTRACT

A rotary electric machine includes a rotor, a stator, a substrate, a bus bar, a housing having a stator housing portion and a substrate housing portion, and a cover member. The substrate housing portion is located radially outside the stator housing portion. The housing has a connection hole connecting the stator housing portion and the substrate housing portion. The bus bar radially passes through the connection hole. The bus bar includes a coil connection portion electrically connected to the coil in the stator housing portion, and a substrate connection portion electrically connected to the substrate in the substrate housing portion. The bus bar is located on one side in the axial direction of the stator. The cover member has an opposing portion located on one side in the axial direction of the bus bar in the stator housing portion, and having an axial positioning portion for the bus bar.

12 Claims, 7 Drawing Sheets

ROTARY ELECTRIC MACHINE AND PUMP

CROSS-REFERENCE TO RELATED APPLICATIONS

The present invention claims priority under 35 U.S.C. § 119 to Japanese Patent Application No. 2021-059571 filed on Mar. 31, 2021, the entire content of which is incorporated herein by reference.

FIELD OF THE INVENTION

The present invention relates to a rotary electric machine and a pump.

BACKGROUND

For example, an electric oil pump having a structure in which a substrate is located radially outside a cylindrical portion of a motor housing is conventionally known.

The conventional electric oil pump includes a bus bar assembly having a coupling bus bar connected to a coil end, and a connection bus bar assembly having a connection bus bar connecting the coupling bus bar and the substrate. Therefore, there is a problem that the number of components increases and the number of assembling steps of the electric oil pump increases.

SUMMARY

One aspect of an exemplary rotary electric machine of the present invention includes a rotor rotatable about a central axis extending in an axial direction, a stator having a coil and facing the rotor via a gap, a substrate electrically connected to the coil, a bus bar assembly having a bus bar electrically connecting the coil and the substrate and a bus bar holder holding the bus bar, a housing having a stator housing portion that accommodates the stator therein and a substrate housing portion that accommodates the substrate therein, and a cover member having a cylindrical portion surrounding an end portion on one side in the axial direction of the stator. The substrate housing portion is located radially outside the stator housing portion. The housing has a connection hole that connects the inside of the stator housing portion and an inside of the substrate housing portion. A bus bar assembly is passed through the connection hole in a radial direction. The bus bar includes a coil connection portion electrically connected to the coil in the stator housing portion, and a substrate connection portion electrically connected to the substrate in the substrate housing portion. The bus bar assembly is located on one side in the axial direction of the stator in the stator housing portion. The stator housing portion has an opening that opens to one side in the axial direction. The housing includes a lid member that closes the opening. The cover member has an opposing portion located on one side in the axial direction of the bus bar assembly in the stator housing portion. The opposing portion has an axial positioning portion that axially positions the bus bar assembly.

One aspect of an exemplary pump of the present invention includes the rotary electric machine and a pump mechanism connected to the rotor.

The above and other elements, features, steps, characteristics and advantages of the present disclosure will become more apparent from the following detailed description of the preferred embodiments with reference to the attached drawings.

DETAILED DESCRIPTION

In the following description, an X axis, a Y axis, and a Z axis are appropriately illustrated in the drawings. The Y axis indicates a direction in which a central axis J of a rotary electric machine of the embodiment described below extends. The central axis J illustrated in each drawing is a virtual axis. In the following description, a direction in which the central axis J extends, that is, a direction parallel to the Y axis is referred to as "axial direction". A radial direction centered on the central axis J is simply referred to as "radial direction" A circumferential direction centered on the central axis J is simply referred to as "circumferential direction". In the axial direction, a side (+Y side) in which the arrow of the Y axis is directed is referred to as "one side in the axial direction". In the axial direction, a side (−Y side) opposite to the side in which the arrow of the Y axis is directed is referred to as "other side in the axial direction".

The circumferential direction is indicated by an arrow θ in each drawing. In the circumferential direction, the side on which the arrow θ is directed is referred to as "one side in the circumferential direction". In the circumferential direction, the side opposite to the side on which the arrow θ is directed is referred to as "other side in the circumferential direction". The one side in the circumferential direction is a side that advances clockwise around the central axis J when viewed from the one side (+Y side) in the axial direction. The other side in the circumferential direction is a side that advances counterclockwise around the central axis J when viewed from the one side in the axial direction.

A direction parallel to the Z axis is referred to as "vertical direction Z". In the vertical direction Z, a side (+Z side) on which the arrow of the Z axis is directed is referred to as "upper side". In the vertical direction Z, a side (−Z side) opposite to the side on which the arrow of the Z axis is directed is referred to as "lower side". A direction parallel to the X axis is referred to as "width direction X". In the width direction X, a side (+X side) on which the arrow of the X axis is directed is referred to as "one side in the width direction". In the width direction X, a side (−X side) opposite to the side on which the arrow of the X axis is directed is referred to as "other side in the width direction". The axial direction, the vertical direction Z, and the width direction X are directions orthogonal to each other. Note that, the vertical direction Z, the width direction X, the upper side, and the lower side are simply names for describing an arrangement relationship between portions and the like, and an actual arrangement relationship may be an arrangement relationship other than the arrangement relationship indicated by these names.

Figure 1:
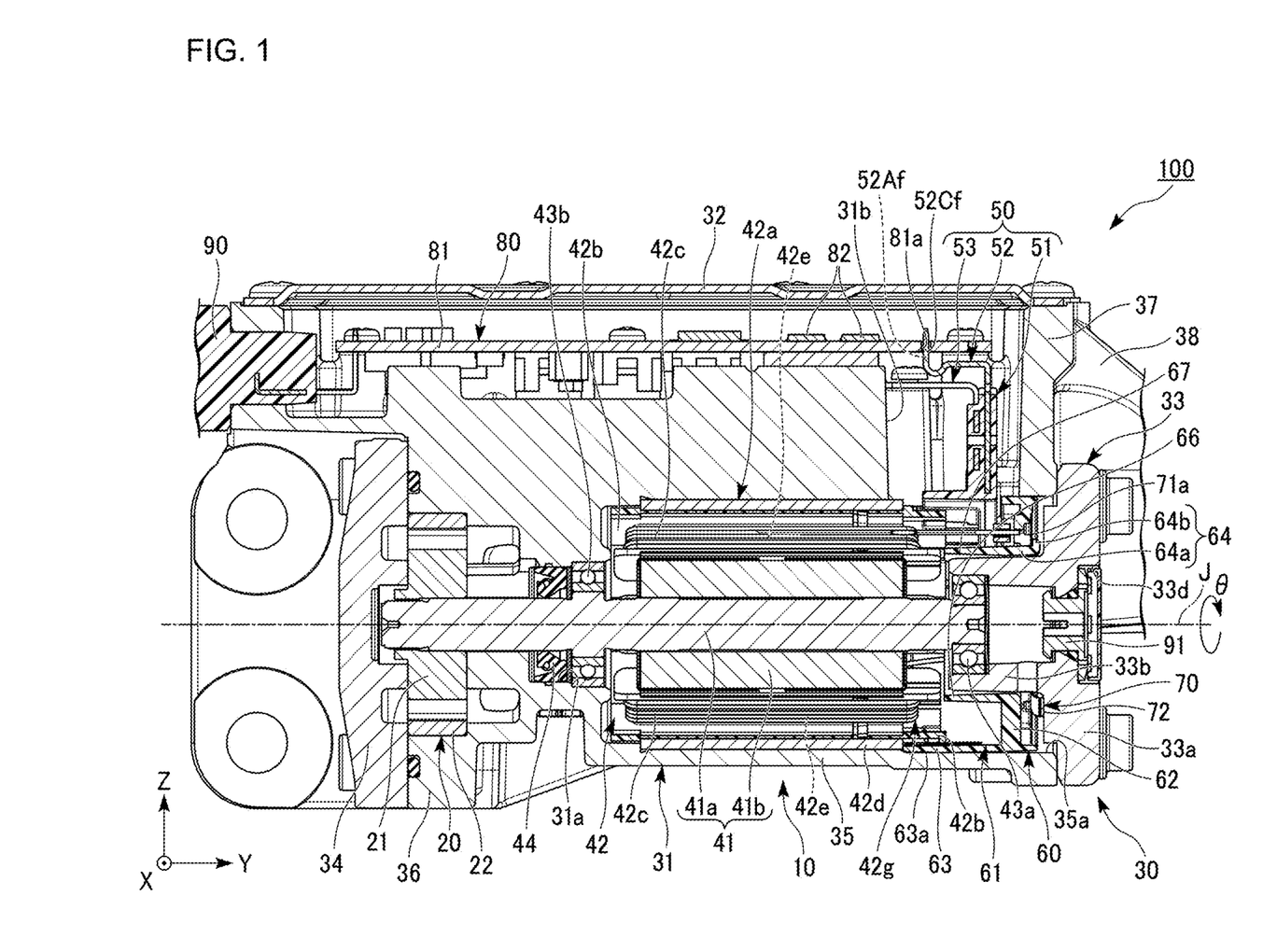
FIG. 1 is a cross-sectional view illustrating a part of a pump of an embodiment.
Figure 2:
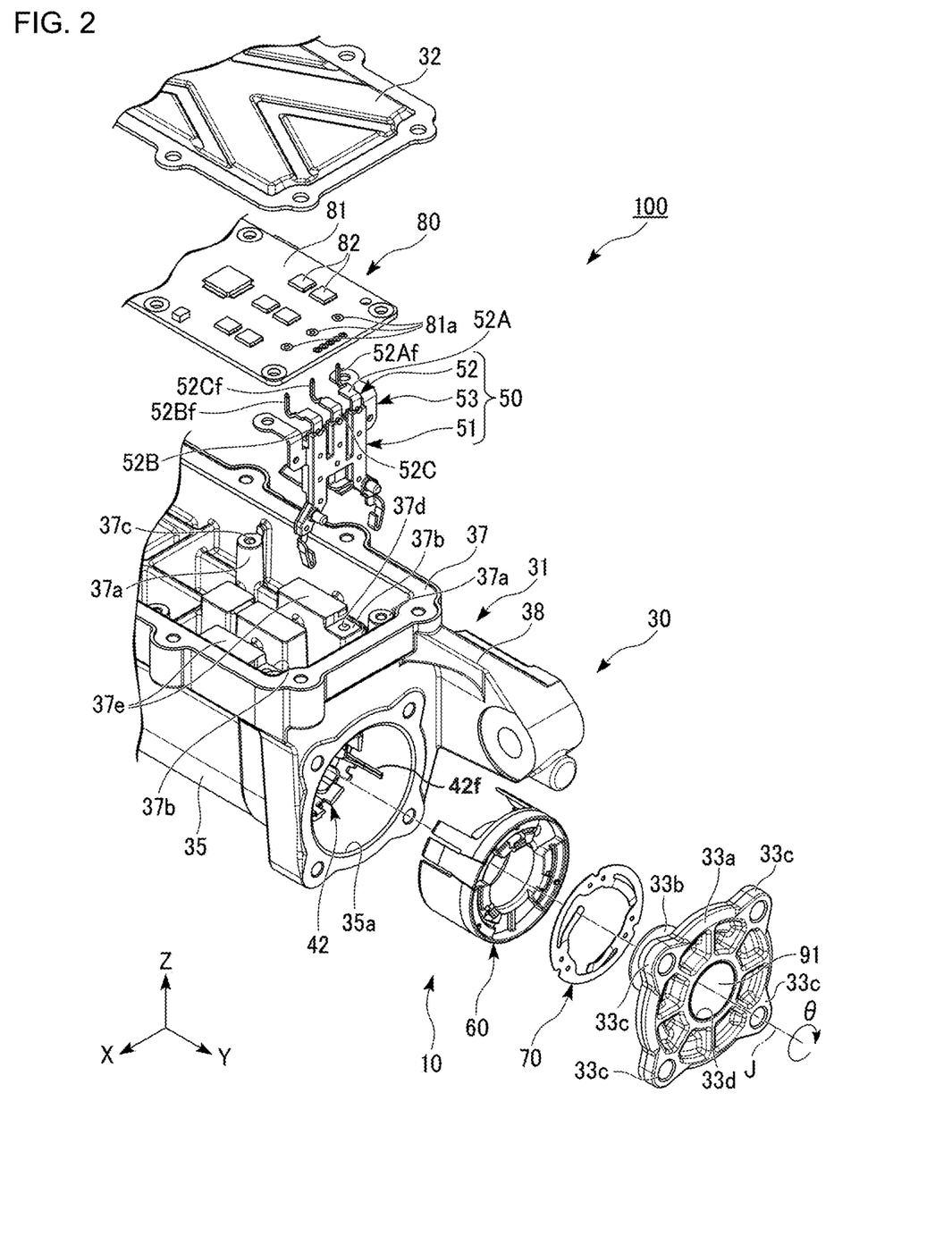
FIG. 2 is a perspective view illustrating a part of a rotary electric machine of an embodiment.

A pump 100 of the present embodiment illustrated in FIGS. 1 and 2 is an electric pump attached to a device mounted on a vehicle. The device mounted with the pump 100 may be an automatic transmission or a drive device that drives an axle of a vehicle. The pump 100 is, for example, an electric oil pump that supplies oil to devices mounted on a vehicle.

As illustrated in FIG. 1, the pump 100 includes a rotary electric machine 10 and a pump mechanism 20. In the present embodiment, the rotary electric machine 10 is a motor. The rotary electric machine 10 includes a housing 30, a rotor 41, a stator 42, bearings 43a and 43b, a bus bar assembly 50, a cover member 60, an elastic member 70, and a substrate 80.

The rotor 41 can rotate about the central axis J extending in the axial direction. The rotor 41 includes a shaft 41a and a rotor body 41b. The shaft 41a has a columnar shape and extends in the axial direction with its center aligned with the central axis J. The shaft 41a is rotatably supported about the central axis J by the bearing 43a and the bearing 43b. That is, the bearings 43a and 43b rotatably support the rotor 41. In the present embodiment, the bearing 43a and the bearing 43b are rolling bearings. The bearings 43a and 43b are ball bearings. The bearing 43a rotatably supports a portion being located further on the one side (+Y side) than the rotor body 41b in the shaft 41a. The bearing 43b rotatably supports a portion being located further on the other side (−Y side) than the rotor body 41b in the shaft 41a. The rotor body 41b is fixed to an outer peripheral surface of the shaft 41a. Although not illustrated, the rotor body 41b includes a rotor core and a rotor magnet.

The stator 42 opposes the rotor 41 across a gap. The stator 42 is located radially outside the rotor 41. The stator 42 includes a stator core 42a, an insulator 42b, and a plurality of coils 42c. The stator core 42a includes: a core back 42d having a cylindrical shape centered on the central axis J; and a plurality of teeth 42e extending radially inward from the core back 42d. The stator core 42a is fixed in a stator housing portion 35 described later. More specifically, the outer peripheral surface of the core back 42d is fixed to the inner peripheral surface of the stator housing portion 35. The plurality of coils 42c are attached to each of the plurality of teeth 42e via the insulator 42b. Each coil 42c has a coil end 42g protruding to one side (+Y side) in the axial direction from the stator core 42a.

The housing 30 accommodates the pump mechanism 20, the rotor 41, the stator 42, the bearings 43a and 43b, the bus bar assembly 50, the cover member 60, the elastic member 70, and the substrate 80 therein. The housing 30 includes a housing body 31, a substrate cover 32, a lid member 33, and a pump cover 34. The housing body 31, the substrate cover 32, the lid member 33, and the pump cover 34 are separate members. The substrate cover 32 is fixed to the upper side of the housing body 31. The lid member 33 is fixed to one side (+Y side) in the axial direction of the housing body 31. The pump cover 34 is fixed to the other side (−Y side) in the axial direction of the housing body 31.

The housing body 31 includes a stator housing portion 35, a pump housing portion 36, a substrate housing portion 37, and a mounting portion 38. In the present embodiment, the stator housing portion 35, the pump housing portion 36, the substrate housing portion 37, and the mounting portion 38 are a part of the same single member. The mounting portion 38 is located on the other side (−X side) in the width direction of the stator housing portion 35 and the pump housing portion 36. The mounting portion 38 is a portion fixed to a device of the vehicle by a screw.

The stator housing portion 35 accommodates the rotor body 41b, the stator 42, the cover member 60, and the elastic member 70 therein. In the present embodiment, the stator housing portion 35 has a cylindrical shape extending in the axial direction. An end portion on one side (+Y side) in the axial direction of the stator housing portion 35 is an end portion on one side in the axial direction of the housing body 31 and is an opening 35a that opens to one side in the axial direction. That is, the stator housing portion 35 has the opening 35a that opens to one side in the axial direction. The opening 35a has a circular shape centered on the central axis J. The opening 35a is closed by the lid member 33.

The pump housing portion 36 is connected to the other side (−Y side) in the axial direction of the stator housing portion 35. The pump housing portion 36 accommodates the pump mechanism 20 therein. The pump housing portion 36 is open to the other side in the axial direction. The opening on the other side in the axial direction of the pump housing portion 36 is closed by the pump cover 34.

The substrate housing portion 37 is located radially outside the stator housing portion 35. In the present embodiment, the substrate housing portion 37 is located above the stator housing portion 35 and the pump housing portion 36. The substrate housing portion 37 extends in the axial direction. An end portion on the other side (−Y side) in the axial direction of the substrate housing portion 37 protrudes to the other side in the axial direction from the pump housing portion 36 and the pump cover 34. A connector portion 90 is provided at the end portion on the other side in the axial direction of the substrate housing portion 37. As illustrated in FIG. 2, the substrate housing portion 37 has a substantially rectangular box shape that opens upward. The lower opening of the substrate housing portion 37 is closed by the substrate cover 32.

The substrate housing portion 37 accommodates the substrate 80 therein. The substrate 80 includes a substrate body 81 whose plate surface faces the vertical direction Z, and a plurality of electronic components 82 attached to the substrate body 81. The electronic component 82 includes, for example, a transistor constituting an inverter circuit that supplies power to the stator 42. The substrate 80 is electrically connected to the coil 42c.

Figure 3:
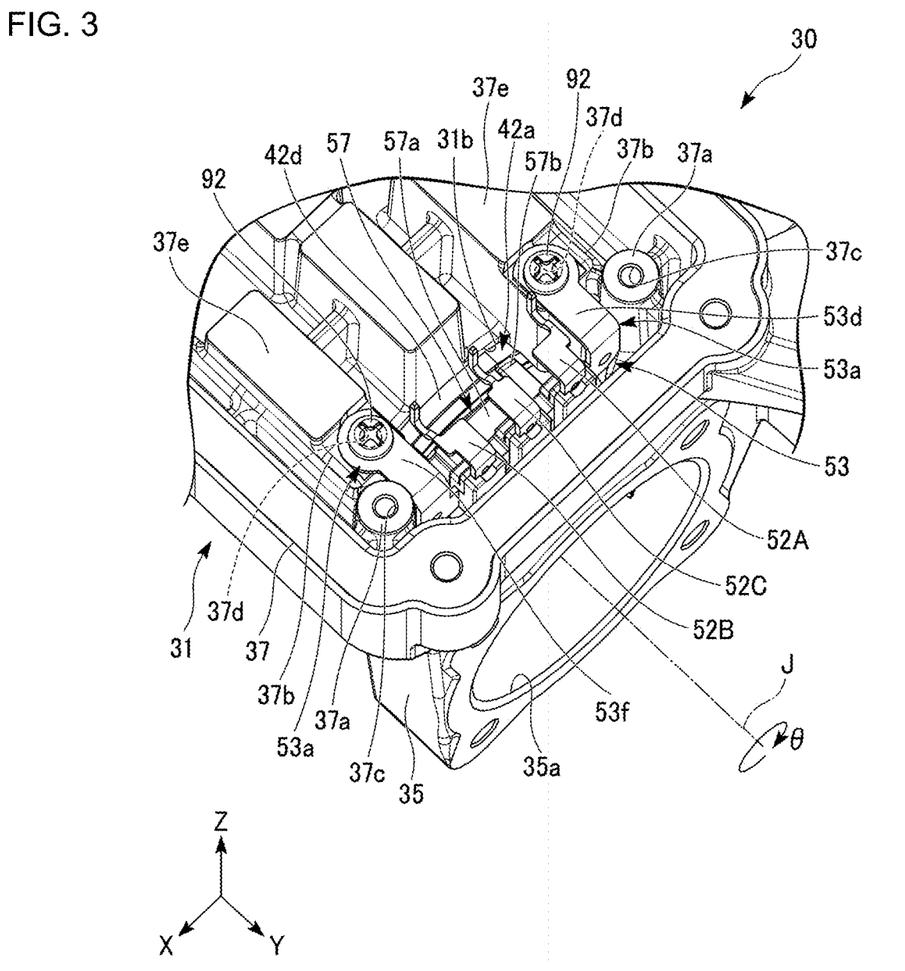
FIG. 3 is a perspective view illustrating a part of a housing and a part of a bus bar assembly of an embodiment.

The substrate housing portion 37 includes a plurality of first fixed portions 37a. In the present embodiment, the first fixed portion 37a has a columnar shape extending upward from the lower bottom portion of the substrate housing portion 37. The first fixed portion 37a is provided on an outer edge portion of the substrate housing portion 37 as viewed in the vertical direction Z. The first fixed portion 37a has a female screw hole 37c recessed downward from the upper surface of the first fixed portion 37a. The substrate 80 is fixed to the first fixed portion 37a. More specifically, an outer edge portion of the substrate body 81 is fixed to the first fixed portion 37a with a screw tightened in the female screw hole 37c. As illustrated in FIG. 3, the plurality of first fixed portions 37a include a pair of first fixed portions 37a disposed with a connection hole 31b sandwiched in the width direction X as viewed in the vertical direction Z.

The substrate housing portion 37 includes a second fixed portion 37b. In the present embodiment, the second fixed portion 37b is an end portion on one side (+Y side) in the axial direction of the quadrangular column portion 37e extending upward from the lower bottom portion of the substrate housing portion 37. The upper surface of the second fixed portion 37*b* is recessed downward from the upper surface of the portion of the column portion 37*e* located on the other side (−Y side) in the axial direction with respect to the second fixed portion 37*b*. The second fixed portion 37*b* has a female screw hole 37*d* recessed downward from the upper surface of the second fixed portion 37*b*.

The second fixed portion 37*b* is provided in a portion on one side (+Y side) in the axial direction in the substrate housing portion 37. In the present embodiment, a pair of second fixed portions 37*b* is provided at intervals in the width direction X. As illustrated in FIG. 3, a fixing member 53 to be described later is fixed to the second fixed portion 37*b*.

As illustrated in FIG. 1, the housing body 31 has a hole 31*a* connecting the inside of the stator housing portion 35 and the inside of the pump housing portion 36 in the axial direction. An oil seal 44 that seals between the inner peripheral surface of the hole 31*a* and the outer peripheral surface of the shaft 41*a* is held in the hole 31*a*. In the hole 31*a*, the bearing 43*b* is held on one side (+Y side) in the axial direction of the oil seal 44.

The housing body 31 has the connection hole 31*b* that connects the inside of the stator housing portion 35 and the inside of the substrate housing portion 37 in the radial direction. That is, the housing 30 has the connection hole 31*b*. The connection hole 31*b* is provided in a portion on one side (+Y side) in the axial direction of the housing body 31. In the present embodiment, the connection hole 31*b* penetrates a wall portion between the inside of the stator housing portion 35 and the inside of the substrate housing portion 37 in the vertical direction Z. The upper end portion of the connection hole 31*b* is open to the end portion on one side in the axial direction inside the substrate housing portion 37. The connection hole 31*b* is located above the coil end 42*g*. The connection hole 31*b* overlaps the end portion on one side in the axial direction of the stator core 42*a* when viewed in the vertical direction Z. As illustrated in FIG. 3, an end portion on one side in the axial direction of the stator core 42*a* is exposed in the connection hole 31*b*. More specifically, the upper end portion of the outer peripheral surface at the end portion on one side in the axial direction of the core back 42*d* is exposed in the connection hole 31*b*.

The lid member 33 closes the opening 35*a*. As illustrated in FIG. 2, the lid member 33 includes a lid body 33*a*, a bearing holding cylinder 33*b*, and a plurality of fixing portions 33*c*. The lid body 33*a* closes the opening 35*a* from one side (+Y side) in the axial direction. The outer shape of the lid body 33*a* as viewed in the axial direction is a circular shape centered on the central axis J. The lid body 33*a* has a hole 33*d* axially penetrating the lid body 33*a* at the center portion in the radial direction. A breather 91 is attached to the hole 33*d*.

The plurality of fixing portions 33*c* protrude radially outward from the lid body 33*a*. The fixing portion 33*c* is fixed to a surface on one side in the axial direction of the stator housing portion 35 by a screw. The plurality of fixing portions 33*c* are disposed at equal intervals over the entire circumference along the circumferential direction. For example, four fixing portions 33*c* are provided.

The bearing holding cylinder 33*b* has a cylindrical shape extending from the lid body 33*a* to the other side in the axial direction. The bearing holding cylinder 33*b* has a cylindrical shape centered on the central axis J. As illustrated in FIG. 1, the bearing holding cylinder 33*b* opens to the other side (−Y side) in the axial direction. The bearing 43*a* is fitted on the radially inner side at the end portion on the other side in the axial direction of the bearing holding cylinder 33*b*. Thus, the bearing holding cylinder 33*b* holds the bearing 43*a*. The inside of the bearing holding cylinder 33*b* is connected to the inside of the hole 33*d*. The end portion on the other side in the axial direction of the bearing holding cylinder 33*b* overlaps the connection hole 31*b* when viewed in the vertical direction Z. The end portion on the other side in the axial direction of the bearing holding cylinder 33*b* is located radially inside the connection hole 31*b*. The bearing holding cylinder 33*b* is located radially inside a cylindrical portion 61 described later of the cover member 60.

The bus bar assembly 50 is passed through the connection hole 31*b* in a radial direction. In the present embodiment, the bus bar assembly 50 is passed through the connection hole 31*b* in the vertical direction Z. The bus bar assembly 50 passes through the connection hole 31*b* from the upper side through the upper opening of the substrate housing portion 37. An upper portion, that is, a radially outer portion, of the bus bar assembly 50 is located in the connection hole 31*b*. A lower portion, that is, a radially inner portion, of the bus bar assembly 50 is located within the stator housing portion 35. The dimension of the lower portion of the bus bar assembly 50 in the width direction X is smaller than the dimension of the connection hole 31*b* in the width direction X. The axial dimension of the lower portion of the bus bar assembly 50 is smaller than the axial dimension of the connection hole 31*b*. The lower portion of the bus bar assembly 50 is located on one side (+Y side) in the axial direction of the stator 42. That is, the bus bar assembly 50 is located on one side in the axial direction of the stator 42 in the stator housing portion 35. The bus bar assembly 50 includes a bus bar holder 51, a bus bar 52, and a fixing member 53.

Figure 4:
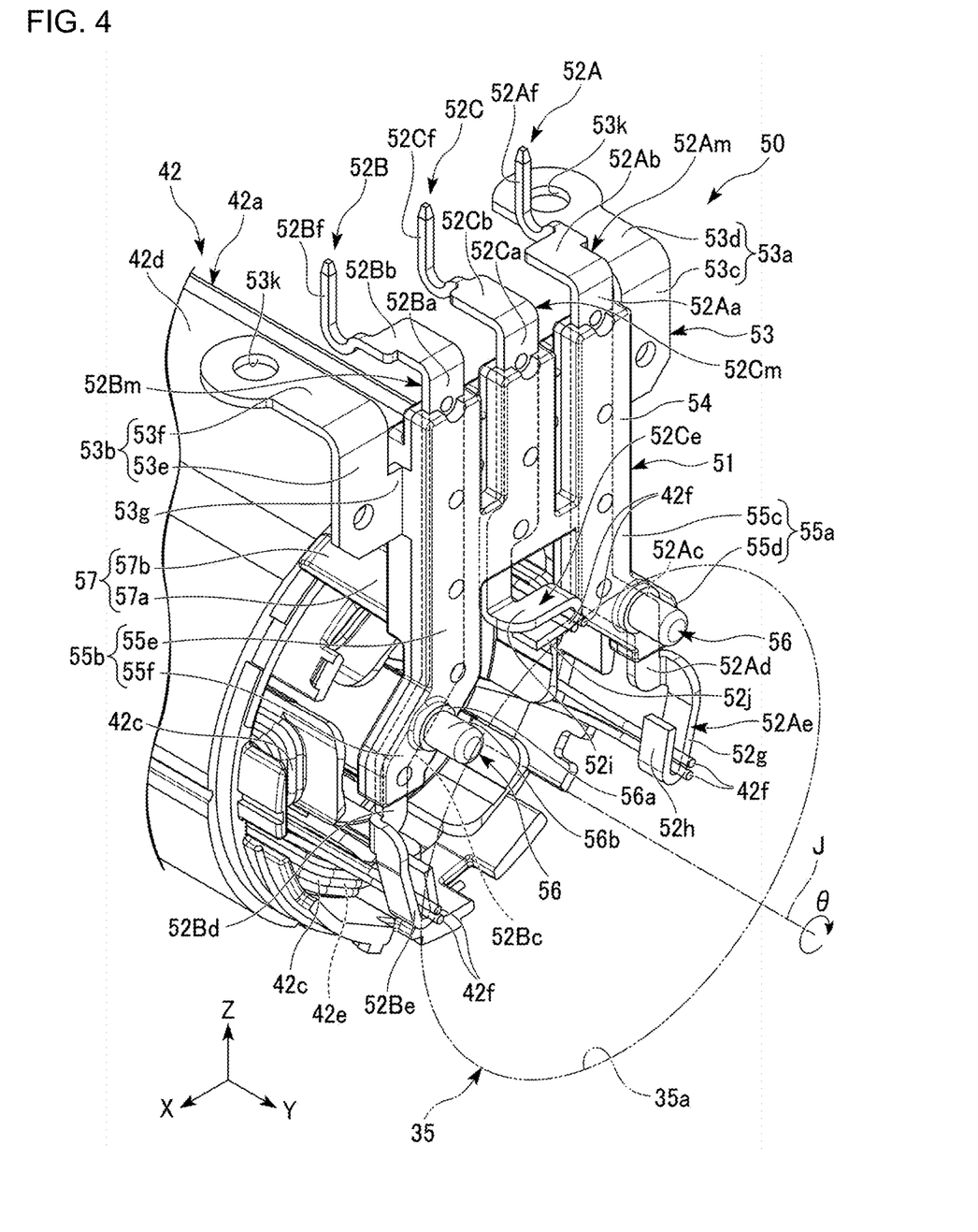
FIG. 4 is a perspective view illustrating a part of a stator and a bus bar assembly according to an embodiment.

The bus bar holder 51 is a member that holds the bus bar 52. The bus bar holder 51 is made of resin. In the present embodiment, the bus bar holder 51 is an insert-molded member formed by insert molding using the bus bar 52 and the fixing member 53 as insert members. As illustrated in FIG. 4, the bus bar holder 51 includes a base portion 54, a pair of leg portions 55*a* and 55*b*, a protruding portion 56, and an abutment portion 57. That is, the bus bar assembly 50 has the protruding portion 56. The base portion 54 is an upper portion of the bus bar holder 51. The outer shape of the base portion 54 viewed in the axial direction is a substantially rectangular shape elongated in the width direction X. The base portion 54 is located above the stator 42, that is, radially outside.

The pair of leg portions 55*a* and 55*b* extends downward from the base portion 54. The pair of leg portions 55*a* and 55*b* has a symmetrical shape in the width direction X. The leg portion 55*a* extends downward from an end portion on the other side (−X side) in the width direction of the base portion 54. The leg portion 55*a* includes a first extending portion 55*c* extending straight downward from the base portion 54 and a second extending portion 55*d* extending downward and toward the other side in the oblique width direction from the lower end portion of the first extending portion 55*c*. The leg portion 55*b* extends downward from an end portion on one side (+X side) in the width direction of the base portion 54. The leg portion 55*b* includes a first extending portion 55*e* extending straight downward from the base portion 54 and a second extending portion 55*f* extending downward and toward one side in the oblique width direction from the lower end portion of the first extending portion 55*e*. The second extending portion 55*d* and the second extending portion 55*f* are separated from each other in the width direction X toward the lower side. The pair of leg portions 55a and 55b overlaps the upper portion of the stator 42 when viewed in the axial direction.

The protruding portion 56 is provided on each of the pair of leg portions 55a and 55b. The pair of protruding portions 56 protrudes to one side (+Y side) in the axial direction from each of the pair of leg portions 55a and 55b. In the present embodiment, the pair of protruding portions 56 is provided in each of the second extending portions 55d and 55f of the pair of leg portions 55a and 55b. The pair of protruding portions 56 has a columnar shape extending in the axial direction.

Figure 5:
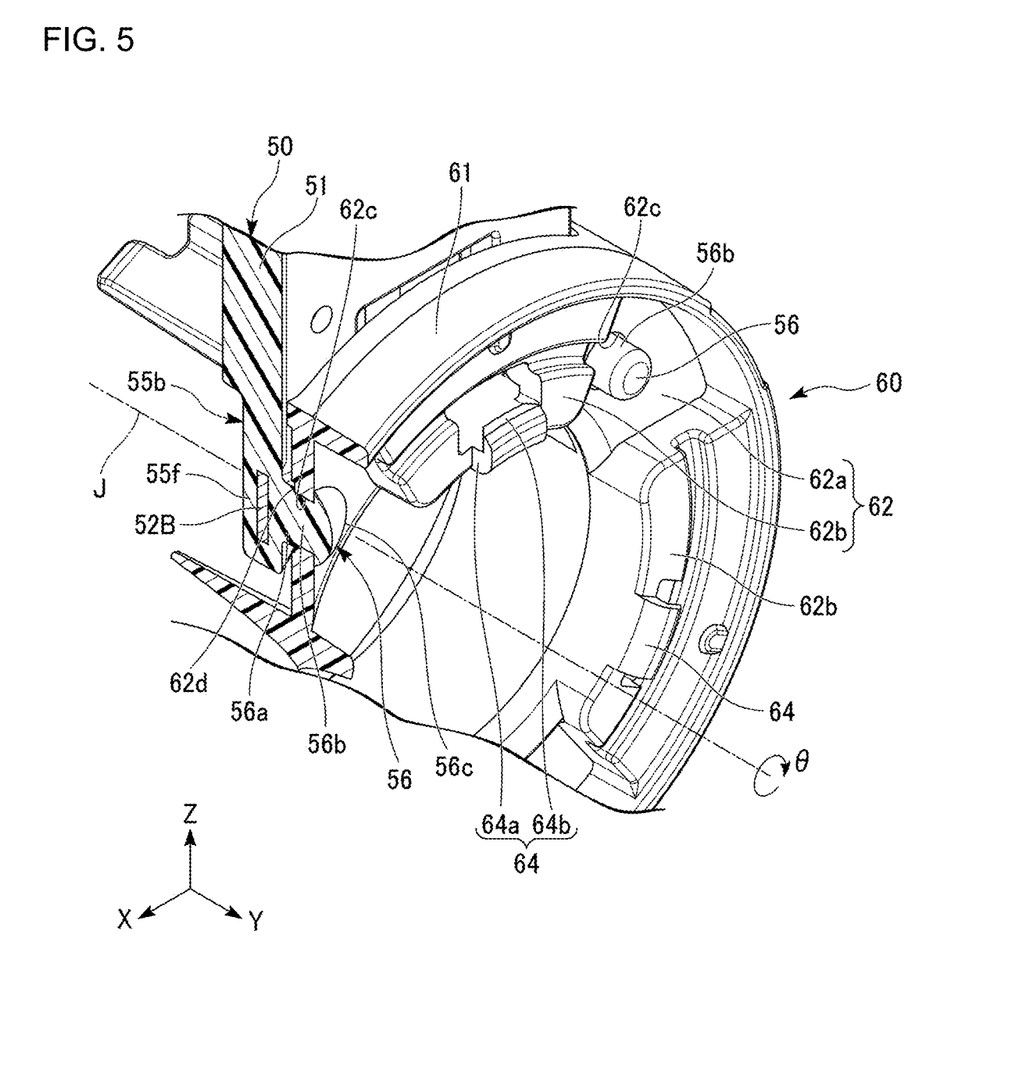
FIG. 5 is a cross-sectional perspective view illustrating a part of a bus bar assembly and a part of a cover member of an embodiment.

The pair of protruding portions 56 is thermally welded to the cover member 60. Although thermal welding is exemplified here, thermal welding, ultrasonic welding, and the like generally referred to as welding can be used. That is, the pair of protruding portions 56 may be welded to the cover member 60 in any manner. FIG. 4 illustrates the protruding portion 56 before being thermally welded. FIG. 5 illustrates a state in which the protruding portion 56 provided in the leg portion 55b is thermally welded, and illustrates a state before the protruding portion 56 provided in the leg portion 55a is thermally welded. As illustrated in FIG. 5, the protruding portion 56 includes a large diameter portion 56a, a small diameter portion 56b, and a thermally-deformed portion 56c.

The large diameter portion 56a is connected to the leg portions 55a and 55b. The small diameter portion 56b is connected to one side (+Y side) in the axial direction of the large diameter portion 56a. The outer diameter of the small diameter portion 56b is smaller than the outer diameter of the large diameter portion 56a. The axial dimension of the small diameter portion 56b is larger than the axial dimension of the large diameter portion 56a. The thermally-deformed portion 56c is connected to one side in the axial direction of the small diameter portion 56b. The thermally-deformed portion 56c has, for example, a hemispherical shape protruding to one side in the axial direction. The thermally-deformed portion 56c is a portion deformed by heat when the end portion on one side in the axial direction of the small diameter portion 56b before being thermally welded is thermally welded. The outer diameter of the thermally-deformed portion 56c is larger than the outer diameter of the large diameter portion 56a, for example.

Figure 6:
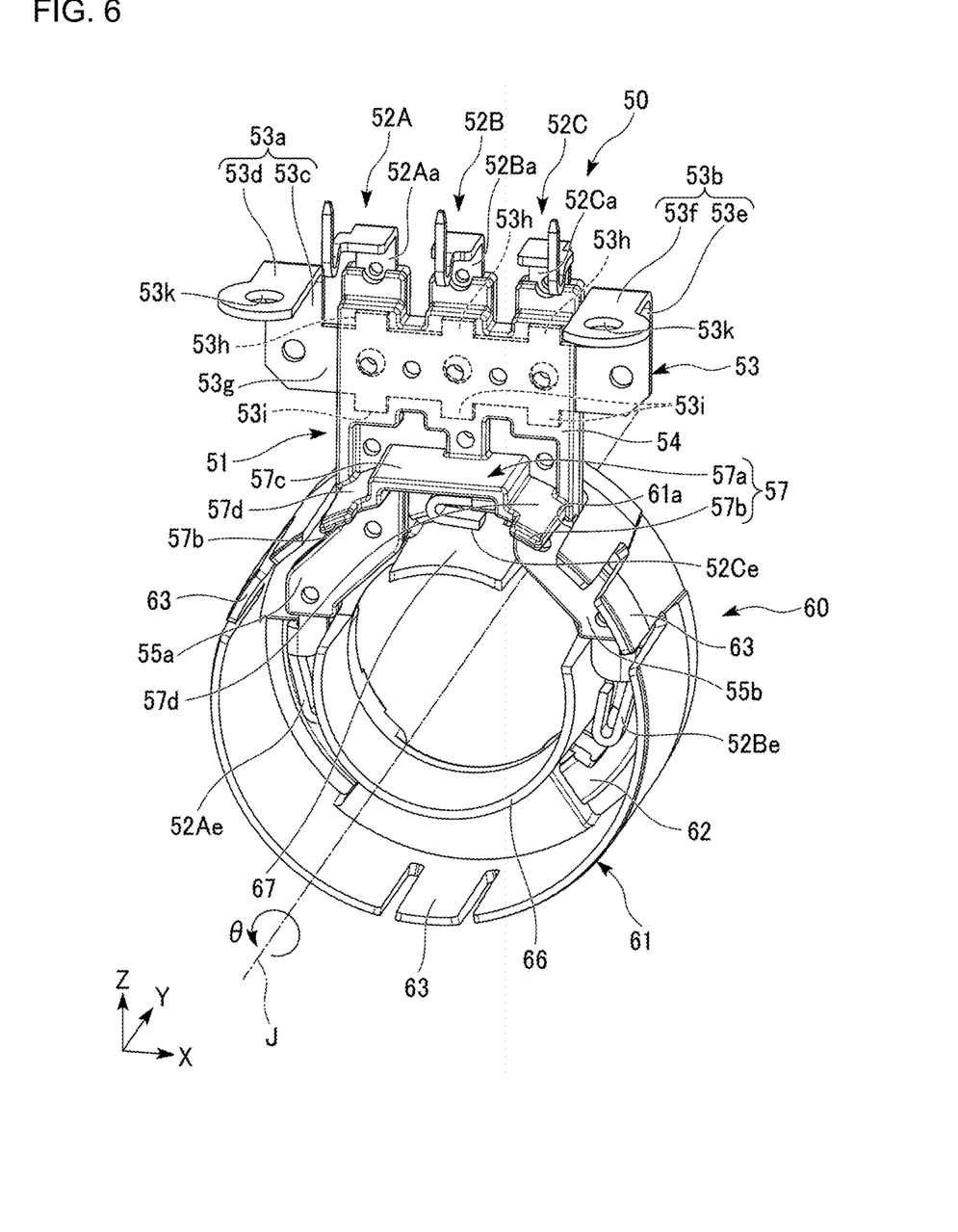
FIG. 6 is a perspective view illustrating a bus bar assembly and a cover member of an embodiment.

As illustrated in FIG. 6, the abutment portion 57 protrudes from the lower end portion of the base portion 54 to the other side (−Y side) in the axial direction. The abutment portion 57 has a plate shape disposed along the circumferential direction. The abutment portion 57 includes an abutment body portion 57a protruding from the base portion 54 to the other side in the axial direction and a pair of abutment convex portions 57b protruding from the abutment body portion 57a to the other side in the axial direction. The abutment body portion 57a has a circumferential central portion 57c and a pair of circumferential side portions 57d. The circumferential central portion 57c is the central portion of the abutment body portion 57a in the circumferential direction. The circumferential central portion 57c has a plate shape whose plate surface is orthogonal to the vertical direction Z. The pair of circumferential side portions 57d extends from the circumferential central portion 57c to both sides in the circumferential direction. The circumferential side portion 57d is located below the circumferential central portion 57c, that is, radially inside. The circumferential side portion 57d is connected to the circumferential central portion 57c via a step. The circumferential dimension of the circumferential side portion 57d is smaller than the circumferential dimension of the circumferential central portion 57c.

In the present embodiment, the pair of abutment convex portions 57b protrudes from each of the pair of circumferential side portions 57d to the other side (−Y side) in the axial direction. As illustrated in FIG. 3, the abutment convex portion 57b abuts on the stator core 42a from one side (+Y side) in the axial direction. More specifically, the abutment convex portion 57b abuts on the upper end portion exposed to the connection hole 31b of the end portion on one side in the axial direction of the core back 42d from one side in the axial direction. Thus, in the present embodiment, the bus bar assembly 50 is in contact with the stator 42 from one side in the axial direction.

As illustrated in FIG. 4, a part of the bus bar 52 is embedded in the bus bar holder 51. Multiple bus bars 52 are provided. In the present embodiment, three bus bars 52, that is, a bus bar 52A, a bus bar 52B, and a bus bar 52C are provided. The three bus bars 52A, 52B, and 52C are disposed side by side in the width direction X. The bus bar 52A and the bus bar 52B are disposed to sandwich the bus bar 52C in the width direction X. The bus bar 52A is located on the other side (−X side) in the width direction of the bus bar 52C. The bus bar 52B is located on one side (+X side) in the width direction of the bus bar 52C. The bus bar 52A and the bus bar 52C have symmetrical shapes in the width direction X.

The bus bar 52A includes a bus bar body portion 52Am, a coil connection portion 52Ae, and a substrate connection portion 52Af. The bus bar body portion 52Am connects the coil connection portion 52Ae and the substrate connection portion 52Af. The bus bar body portion 52Am extends in the vertical direction Z as a whole. The bus bar body portion 52Am includes a first portion 52Aa, a second portion 52Ab, a third portion 52Ac, and a fourth portion 52Ad.

The first portion 52Aa extends in the vertical direction Z. The first portion 52Aa is embedded and held across the base portion 54 and the first extending portion 55c. An upper end portion of the first portion 52Aa protrudes upward from the base portion 54 and is exposed to the outside of the bus bar holder 51. The second portion 52Ab extends from the upper end portion of the first portion 52Aa to the other side (−Y side) in the axial direction. The third portion 52Ac extends downward and toward the other side (−X side) in the oblique width direction from the lower end portion of the first portion 52Aa. The third portion 52Ac is embedded and held in the second extending portion 55d. The fourth portion 52Ad extends downward from the lower end portion of the third portion 52Ac. The fourth portion 52Ad protrudes downward from the leg portion 55a and is exposed to the outside of the bus bar holder 51. The plate surface of the first portion 52Aa, the plate surface of the third portion 52Ac, and the plate surface of the fourth portion 52Ad face the axial direction. The plate surface of the second portion 52Ab faces the vertical direction Z.

The coil connection portion 52Ae is connected to the lower end portion of the fourth portion 52Ad. The coil connection portion 52Ae is located on one side (+Y side) in the axial direction of the stator 42 in the stator housing portion 35. The coil connection portion 52Ae overlaps the opening 35a when viewed from one side (+Y side) in the axial direction. The coil connection portion 52Ae protrudes to one side in the axial direction from the bus bar body portion 52Am. The plate surface of the coil connection portion 52Ae is along the axial direction. In the present embodiment, the coil connection portion 52Ae has a U shape sandwiching a lead wire 42f drawn out from the coil 42c to one side in the axial direction as viewed in the axial direction. The coil connection portion 52Ae has a U shape that opens upward when viewed in the axial direction. That is, the bus bar 52A is the bus bar 52 in which the coil connection portion 52Ae is opened to the upper side in the vertical direction Z.

In the present specification, "a certain object has a U shape" includes not only a case where the certain object has a strictly U shape but also a case where the certain object has a substantially U shape. The "substantially U shape" includes a shape in which two opposing sides have different lengths, a shape in which two opposing sides are inclined with respect to each other, and the like. "A certain object has a U shape" may be any shape as long as one ends of two sides are connected to each other and the other ends of the two sides face each other with a gap.

The coil connection portion 52Ae includes a first holding portion 52g connected to the bus bar body portion 52Am and a second holding portion 52h that sandwiches the lead wire 42f with the first holding portion 52g and the second holding portion 52h. The first holding portion 52g and the second holding portion 52h extend slightly inclined with respect to the vertical direction Z. The second holding portion 52h is located radially inside the first holding portion 52g. The lower end portion of the first holding portion 52g and the lower end portion of the second holding portion 52h are connected to each other. In the present embodiment, two lead wires 42f are gripped by the coil connection portion 52Ae. The lead wire 42f is fixed to the coil connection portion 52Ae by, for example, welding. As a result, the coil connection portion 52Ae is electrically connected to the coil 42c in the stator housing portion 35.

The substrate connection portion 52Af extends upward from an end portion on the other side (−Y side) in the axial direction of the second portion 52Ab. In the present embodiment, the substrate connection portion 52Af has an elongated quadrangular prism shape. As illustrated in FIG. 1, the substrate connection portion 52Af is located in the substrate housing portion 37. The substrate connection portion 52Af passes through a through hole 81a provided in the substrate body 81 from below. The substrate connection portion 52Af is fixed to the substrate body 81 by, for example, soldering. As a result, the substrate connection portion 52Af is electrically connected to the substrate 80 in the substrate housing portion 37. Therefore, the bus bar 52A electrically connects the coil 42c and the substrate 80.

As illustrated in FIG. 4, the bus bar 52B has the same configuration as that of the bus bar 52A except that the bus bar 52B is provided across the base portion 54 and the leg portion 55b and has a symmetrical shape in the width direction X with respect to the bus bar 52A. The bus bar 52B includes a bus bar body portion 52Bm, a coil connection portion 52Be, and a substrate connection portion 52Bf. The bus bar body portion 52Bm includes a first portion 52Ba, a second portion 52Bb, a third portion 52Bc, and a fourth portion 52Bd. Each part of the bus bar 52B has a symmetrical shape and arrangement in the width direction X with respect to each part having a similar name in the bus bar 52A.

The bus bar 52C includes a bus bar body portion 52Cm, a coil connection portion 52Ce, and a substrate connection portion 52Cf. The bus bar body portion 52Cm includes a first portion 52Ca and a second portion 52Cb. The first portion 52Ca extends in the vertical direction Z. The first portion 52Ca is held in a portion of the base portion 54 located between the pair of leg portions 55a and 55b in the width direction X. Both end portions of the first portion 52Ca in the vertical direction Z protrude from the base portion 54 in the vertical direction Z. A part of the portion of the first portion 52Ca held by the base portion 54 is bent to one side (+X side) in the width direction. The second portion 52Cb extends from the upper end portion of the first portion 52Ca to the other side (−Y side) in the axial direction. The substrate connection portion 52Cf extends upward from the end portion on the other side in the axial direction of the second portion 52Cb. The substrate connection portions 52Af, Bf, and Cf of the bus bars 52A, 52B, and 52C are disposed side by side at intervals in the width direction X.

The coil connection portion 52Ce is connected to the lower end portion of the first portion 52Ca. In the present embodiment, the coil connection portion 52Ce has a U shape that opens to one side (+X side) in the width direction when viewed in the axial direction. The coil connection portion 52Ce includes a first holding portion 52i connected to the bus bar body portion 52Cm and a second holding portion 52j that sandwiches the lead wire 42f between the first holding portion 52i and the second holding portion 52j. The first holding portion 52i and the second holding portion 52j extend substantially in the width direction X. The first holding portion 52i and the second holding portion 52j are disposed to face each other in the vertical direction Z. The second holding portion 52j is located radially inside, that is, below the first holding portion 52i. The end portion on the other side (−X side) in the width direction of the first holding portion 52i and the end portion on the other side in the width direction of the second holding portion 52j are connected to each other. Other configurations of the coil connection portion 52Ce are similar to other configurations of the coil connection portions 52Ae and 52Be.

The fixing member 53 is partially embedded in the bus bar holder 51 and held by the bus bar holder 51. In the present embodiment, the fixing member 53 is a plate-like member made of metal. The fixing member 53 is located on the other side (−Y side) in the axial direction of the plurality of bus bars 52A, 52B, and 52C. As illustrated in FIG. 6, the fixing member 53 includes a coupling portion 53g and a pair of arm portions 53a and 53b. The coupling portion 53g extends in the width direction X. The plate surface of the coupling portion 53g faces the axial direction. The coupling portion 53g is held by the base portion 54. Both end portions of the coupling portion 53g in the width direction X protrude from the base portion 54 in the width direction X. The coupling portion 53g is located on the other side in the axial direction of the first portions 52Aa, 52Ba, and 52Ca. In a portion of the coupling portion 53g embedded in the base portion 54, three upper protrusions 53h protruding upward and three lower protrusions 53i protruding downward are provided. Each of the upper protrusions 53h and each of the lower protrusions 53i are disposed at a position overlapping each of the bus bars 52A, 52B, and 52C when viewed in the axial direction.

The pair of arm portions 53a and 53b is connected to both end portions in the width direction X of the coupling portion 53g. The arm portion 53a includes a first extending portion 53c extending upward from an end portion on the other side (−X side) in the width direction of the coupling portion 53g and a second extending portion 53d extending from an upper end portion of the first extending portion 53c to the other side (−Y side) in the axial direction. The arm portion 53b includes a first extending portion 53e extending upward from an end portion on one side (+X side) in the width direction of the coupling portion 53g and a second extending portion 53f extending from an upper end portion of the first extending portion 53e to the other side in the axial direction. The plate surfaces of the first extending portions 53c and 53e face the axial direction. The plate surfaces of the second extending portions 53d and 53f face the vertical direction Z. The second extending portions 53d and 53f are located below the second portions 52Ab, 52Bb, and 52Cb. Through holes 53k axially penetrating the second extending portions 53d and 53f are provided at the end portions on the other side in the axial direction of the second extending portions 53d and 53f, respectively.

As illustrated in FIG. 3, the pair of arm portions 53a and 53b is located inside the substrate housing portion 37. The pair of arm portions 53a and 53b is fixed to the pair of second fixed portions 37b with screws 92. More specifically, the screws 92 passed through the through holes 53k provided in the second extending portions 53d and 53f from above are tightened into the female screw holes 37d, whereby the second extending portions 53d and 53f are fixed to the second fixed portion 37b, respectively. That is, in the present embodiment, the fixing member 53 is fixed to the second fixed portion 37b by the screw 92 tightened from the radially outside. Accordingly, the fixing member 53 is fixed to the housing 30.

Figure 7:
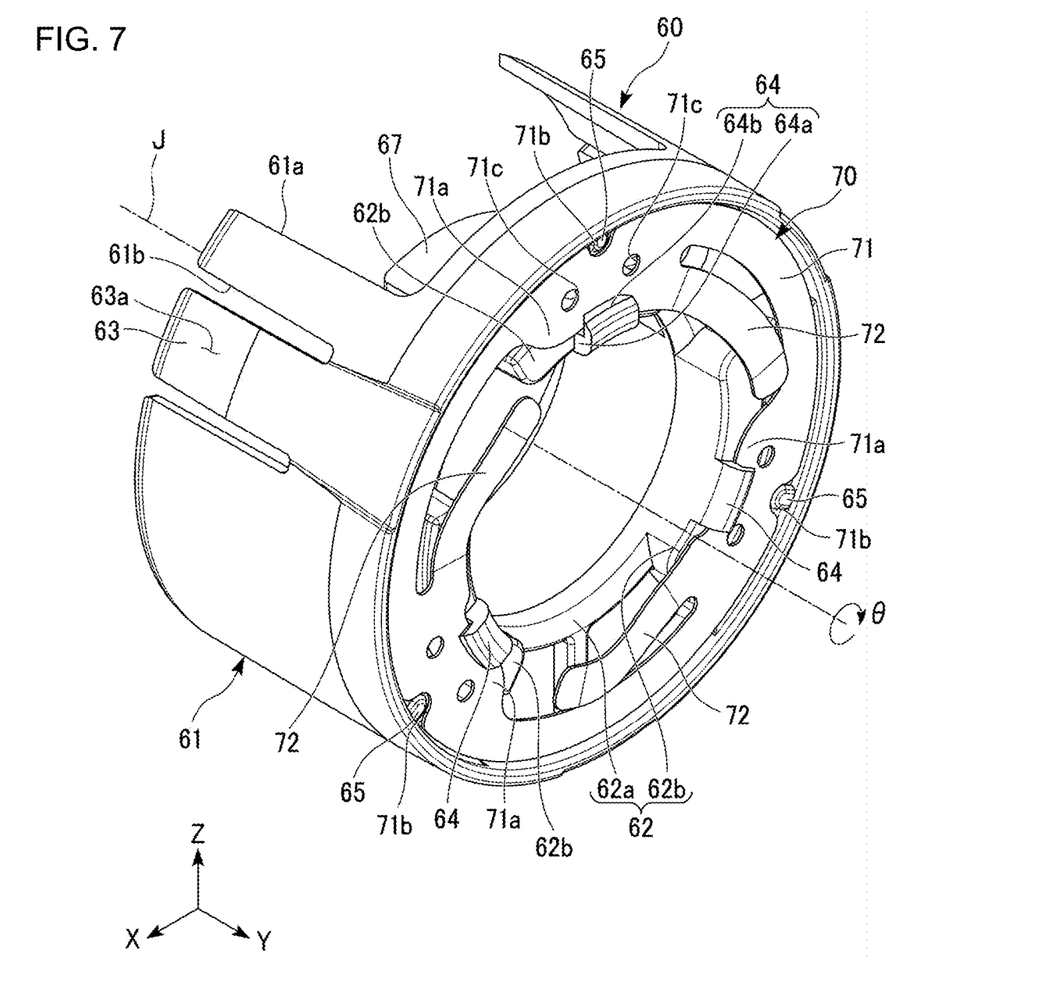
FIG. 7 is a perspective view illustrating a cover member and an elastic member of an embodiment.

As illustrated in FIG. 1, the cover member 60 sandwiches the lower portion of the bus bar assembly 50 in the stator housing portion 35 in the axial direction with respect to the stator 42. As illustrated in FIG. 2, the cover member 60 is a cylindrical member that is open to the other side (−Y side) in the axial direction with the central axis J as the center. The cover member 60 is inserted into the opening 35a from one side (+Y side) in the axial direction and accommodated in the stator housing portion 35. The cover member 60 is made of resin. As illustrated in FIG. 7, the cover member 60 includes a cylindrical portion 61, an opposing portion 62, and a claw portion 64.

The cylindrical portion 61 has a cylindrical shape extending in the axial direction and opening to the other side (−Y side) in the axial direction. The cylindrical portion 61 has a penetrating portion 61a. The penetrating portion 61a penetrates the wall portion of the cylindrical portion 61 in the radial direction. In the present embodiment, the penetrating portion 61a penetrates the upper wall portion of the cylindrical portion 61 in the vertical direction Z. As illustrated in FIG. 6, the bus bar holder 51 is passed through the penetrating portion 61a in the vertical direction Z. As a result, the bus bar assembly 50 is hooked in the circumferential direction on both edges of the penetrating portion 61a in the circumferential direction. Therefore, the cover member 60 is prevented from rotating in the circumferential direction with respect to the bus bar assembly 50. The pair of leg portions 55a and 55b and the coil connection portions 52Ae, 52Be, and 52Ce are located radially inside the cylindrical portion 61.

As illustrated in FIG. 1, the cylindrical portion 61 is fitted to the inner peripheral surface of the stator housing portion 35. The end portion on the other side (−Y side) in the axial direction of the cylindrical portion 61 is located radially outside the end portion on one side (+Y side) in the axial direction of the stator 42. As a result, the cylindrical portion 61 surrounds the end portion on one side in the axial direction of the stator 42. In the present embodiment, the cylindrical portion 61 surrounds a portion of the insulator 42b protruding to one side in the axial direction from the stator core 42a and the coil end 42g. The end portion on the other side in the axial direction of the cylindrical portion 61 faces one side in the axial direction of the stator core 42a with a gap interposed therebetween. In the present embodiment, the end portion on the other side in the axial direction of the cylindrical portion 61 faces one side in the axial direction of the core back 42d with a gap interposed therebetween.

As illustrated in FIG. 7, the cylindrical portion 61 includes a slit 61b and an elastically deformable portion 63. The slit 61b is provided in a portion on the other side (−Y side) in the axial direction of the cylindrical portion 61. The slit 61b penetrates the wall portion of the cylindrical portion 61 in the radial direction and is open to the other side in the axial direction. The elastically deformable portion 63 extends from an edge on one side (+Y side) in the axial direction of the inner edge portion of the slit 61b to the other side in the axial direction. The elastically deformable portion 63 is a portion elastically deformable in the radial direction with the edge of the slit 61b as a fulcrum. The axial position at the end portion on the other side in the axial direction of the elastically deformable portion 63 is the same as the axial position at the end portion on the other side in the axial direction of the portion of the cylindrical portion 61 where the slit 61b is not provided.

A portion on the other side (−Y side) in the axial direction of the radially outer surface of the elastically deformable portion 63 is an inclined surface 63a located on the radially inner side toward the other side in the axial direction. In a state before the cylindrical portion 61 is disposed in the stator housing portion 35, the end portion on the other side in the axial direction of the inclined surface 63a is located radially inside the inner edge of the opening 35a. In a state before the cylindrical portion 61 is disposed in the stator housing portion 35, the end portion on one side in the axial direction of the inclined surface 63a is located radially outside the inner edge of the opening 35a. When the cylindrical portion 61 is inserted into the stator housing portion 35 from the opening 35a, the inclined surface 63a is pressed radially inward by the inner peripheral surface of the stator housing portion 35. As a result, the elastically deformable portion 63 is elastically deformed radially inward, and is in a state of being pressed against the inner peripheral surface of the stator housing portion 35 from the radially inner side. As illustrated in FIG. 6, a plurality of elastically deformable portions 63 are provided at intervals in the circumferential direction. In the present embodiment, three elastically deformable portions 63 are provided at equal intervals over the entire circumference along the circumferential direction.

As illustrated in FIGS. 1, 5, and 6, the opposing portion 62 is located on one side (+Y side) in the axial direction of the bus bar assembly 50 in the stator housing portion 35. The opposing portion 62 has an annular shape surrounding the central axis J. The radially outer edge portion of the opposing portion 62 is connected to the inner peripheral surface of the portion on one side in the axial direction of the cylindrical portion 61. The opposing portion 62 is located on the other side (−Y side) in the axial direction with respect to the end portion on one side in the axial direction of the cylindrical portion 61.

As illustrated in FIG. 7, the opposing portion 62 includes an annular base portion 62a surrounding the central axis J and a support portion 62b protruding from the base portion 62a to one side (+Y side) in the axial direction. The support portion 62b extends in the circumferential direction. A plurality of support portions 62b are provided at intervals in the circumferential direction. In the present embodiment, three support portions 62b are provided at equal intervals over the entire circumference along the circumferential direction. The radially outer end portion of the support portion 62b is connected to the inner peripheral surface of the cylindrical portion 61. A convex portion 65 protruding to one side in the axial direction is provided at the central portion in the circumferential direction in the radially outer edge portion of each support portion 62b.

As illustrated in FIG. 5, the opposing portion 62 includes a hole 62c that penetrates the opposing portion 62 in the axial direction. In the present embodiment, the hole 62c corresponds to a "radial positioning portion". The hole 62c penetrates the base portion 62a in the axial direction. In the present embodiment, a plurality of holes 62c are provided at intervals in the circumferential direction. A pair of holes 62c is provided at intervals in the width direction X. The pair of holes 62c is located above the central axis J. One of the pair of holes 62c is located on one side (+X side) in the width direction with respect to the central axis J, and the other is located on the other side (−X side) in the width direction with respect to the central axis J.

The pair of protruding portions 56 pass through the pair of holes 62c from the other side (−Y side) in the axial direction. With such a configuration, the hole 62c which is a radial positioning portion positions the bus bar assembly 50 in the radial direction. The small diameter portion 56b is inserted into the hole 62c. The thermally-deformed portion 56c is located on one side (+Y side) in the axial direction with respect to the hole 62c. The thermally-deformed portion 56c is thermally welded to the surface on one side in the axial direction of the base portion 62a. Accordingly, the bus bar holder 51 and the cover member 60 are fixed to each other.

The peripheral edge of the hole 62c in the surface on the other side (−Y side) in the axial direction of the opposing portion 62 is an axial positioning portion 62d. That is, the opposing portion 62 includes the axial positioning portion 62d. The axial positioning portion 62d is in contact with the bus bar assembly 50 from one side (+Y side) in the axial direction. More specifically, the axial positioning portion 62d is in contact with the large diameter portion 56a from one side in the axial direction. As a result, the axial positioning portion 62d axially positions the bus bar assembly 50.

The claw portion 64 has a root portion 64a protruding to one side (+Y side) in the axial direction from the support portion 62b, and a claw body portion 64b protruding radially outward from an end portion on one side in the axial direction of the root portion 64a. The claw portion 64 is provided in each support portion 62b. That is, in the present embodiment, three claw portions 64 are provided. Each claw portion 64 is provided at the center in the circumferential direction of the radially inner edge portion of each support portion 62b.

As illustrated in FIG. 6, the cover member 60 includes inner peripheral wall portions 66 and 67. The inner peripheral wall portions 66 and 67 protrude from the radially inner edge portion of the opposing portion 62 to the other side (−Y side) in the axial direction. The inner peripheral wall portion 66 extends in the circumferential direction and surrounds the central axis J. The inner peripheral wall portion 66 has a C shape that opens upward when viewed in the axial direction. The inner peripheral wall portion 67 is provided at an upper end portion of the radially inner edge portion of the opposing portion 62. The inner peripheral wall portion 67 is disposed away from each of both circumferential end portions of the inner peripheral wall portion 66 in the circumferential direction. The inner peripheral wall portion 67 has an arc shape protruding upward about the central axis J as viewed in the axial direction.

The end portions on the other side in the axial direction of the inner peripheral wall portions 66 and 67 are located on one side (+Y side) in the axial direction with respect to the end portion on the other side in the axial direction of the cylindrical portion 61. The pair of leg portions 55a and 55b and the coil connection portions 52Ae and 52Be are located between the inner peripheral wall portion 66 and the cylindrical portion 61 in the radial direction. The coil connection portion 52Ce is located between the inner peripheral wall portion 67 and the body portion 57a of the abutment portion 57 in the radial direction. As illustrated in FIG. 1, the bearing holding cylinder 33b is located radially inside the inner peripheral wall portions 66 and 67.

The elastic member 70 is positioned between the lid member 33 and the cover member 60 in the axial direction. More specifically, the elastic member 70 is positioned between the lid body 33a and the opposing portion 62 in the axial direction. As illustrated in FIG. 7, in the present embodiment, the elastic member 70 is attached to the cover member 60. More specifically, the elastic member 70 is held on a surface on one side (+Y side) in the axial direction of the opposing portion 62. In the present embodiment, the elastic member 70 has a plate shape whose plate surface faces the axial direction. The elastic member 70 includes a held portion 71 and a contact portion 72.

The held portion 71 is a portion held on one side (+Y side) in the axial direction of the opposing portion 62. The held portion 71 has an annular shape surrounding the central axis J. The held portion 71 is fitted into the cylindrical portion 61 on one side in the axial direction of the opposing portion 62. The held portion 71 is supported by the plurality of support portions 62b from the other side (−Y side) in the axial direction. The held portion 71 has a protruding portion 71a protruding radially inward. A plurality of protruding portions 71a are provided at intervals in the circumferential direction. In the present embodiment, three protruding portions 71a are provided at equal intervals over the entire circumference along the circumferential direction. Each protruding portion 71a is located on one side in the axial direction of each support portion 62b. The radially inner edge portion of the protruding portion 71a is located on the other side in the axial direction of the claw body portion 64b. As a result, the claw portion 64 is hooked on the held portion 71 from one side in the axial direction.

The held portion 71 has a concave portion 71b recessed radially inward at the radially outer edge portion. A plurality of concave portions 71b are provided at intervals in the circumferential direction. In the present embodiment, three concave portions 71b are provided at equal intervals over the entire circumference along the circumferential direction. Each convex portion 65 is located inside each concave portion 71b. As a result, the elastic member 70 is positioned in the circumferential direction. The held portion 71 has a through hole 71c axially penetrating the held portion 71. Two through holes 71c are provided at intervals in the circumferential direction for each protruding portion 71a.

The contact portion 72 is connected to the held portion 71. The contact portion 72 is a leaf spring. In the present embodiment, the contact portion 72 extends from each of the protruding portions 71a to one side (+θ side) in the circumferential direction. That is, in the present embodiment, three contact portions 72 are provided. A portion on one side in the circumferential direction of the contact portion 72 is located on one side (+Y side) in the axial direction with respect to the held portion 71. As illustrated in FIG. 1, the contact portion 72 is in contact with a surface on the other side (−Y side) in the axial direction of the lid body 33a. Thus, the contact portion 72 is in contact with the lid member 33 from the other side in the axial direction. The contact portion 72 is elastically deformed to the other side in the axial direction. As a result, the elastic member 70 applies a force toward the other axial direction (−Y direction) to the cover member 60.

The pump mechanism 20 is accommodated in the pump housing portion 36. The pump mechanism 20 has an inner rotor 21 and an outer rotor 22. The inner rotor 21 is connected to a portion of the shaft 41a protruding into the pump housing portion 36. Thus, the pump mechanism 20 is connected to the rotor 41. The outer rotor 22 has an annular shape surrounding the inner rotor 21. The inner rotor 21 and the outer rotor 22 mesh with each other. The outer rotor 22 also rotates with the rotation of the inner rotor 21 by the shaft 41a.

A worker or the like who assembles the rotary electric machine 10 of the present embodiment inserts the stator 42 from the opening 35a into the stator housing portion 35, and then inserts the bus bar assembly 50 from above into the connection hole 31b from the upper opening of the substrate housing portion 37. The worker or the like fixes the fixing member 53 of the bus bar assembly 50 to the second fixed portion 37b by a screw 92 from the upper opening of the substrate housing portion 37. Next, the worker or the like welds and fixes the lead wire 42f to each of the coil connection portions 52Ae, 52Be, and 52Ce of the bus bar assembly 50 via the opening 35a.

Next, the worker or the like fits the cover member 60 into the stator housing portion 35 from the opening 35a. At this time, the worker or the like passes the pair of protruding portions 56 of the bus bar assembly 50 through the pair of holes 62c provided in the opposing portion 62. For example, the worker or the like pushes the cover member 60 into the stator housing portion 35 until the convex portion 57b of the abutment portion 57 butts against the stator core 42a from one side (+Y side) in the axial direction and the axial positioning portion 62d of the cover member 60 comes into contact with the large diameter portion 56a of the protruding portion 56 from one side in the axial direction.

The worker or the like applies heat to a portion of the protruding portion 56 protruding from the hole 62c to one side (+Y side) in the axial direction to thermally weld the protruding portion 56 to the opposing portion 62. As a result, a part of the small diameter portion 56b of the protruding portion 56 is deformed by heat to form the thermally-deformed portion 56c. Next, the worker or the like inserts the elastic member 70 into the stator housing portion 35 from the opening 35a, and holds the elastic member 70 on one side in the axial direction of the opposing portion 62 of the cover member 60. Next, the worker or the like accommodates the rotor 41 inside the stator housing portion 35 via the opening 35a. After accommodating the rotor 41, the worker or the like fixes the lid member 33 to the stator housing portion 35 and closes the opening 35a.

When the lid member 33 is fixed, the contact portion 72 of the elastic member 70 is elastically deformed, and the cover member 60 is pushed to the other side (−Y side) in the axial direction by the elastic member 70. As a result, a state in which the convex portion 57b of the abutment portion 57 butts against the stator core 42a from one side (+Y side) in the axial direction and the axial positioning portion 62d of the cover member 60 is in contact with the large diameter portion 56a of the protruding portion 56 from one side in the axial direction is maintained. Therefore, the bus bar assembly 50 is prevented from moving in the axial direction.

In a case where the abutment portion 57 does not butt against the stator core 42a in the axial direction when the bus bar assembly 50 is fixed to the second fixed portion 37b with the screw 92, the abutment portion 57 of the bus bar assembly 50 butts against the stator core 42a by the cover member 60 pushing the bus bar assembly 50 to the other side (−Y side) in the axial direction. At this time, the position of the bus bar assembly 50 is slightly displaced with respect to the position fixed to the second fixed portion 37b by the screw 92, but the displacement is absorbed by the elastic deformation of the fixing member 53. Elastic force in one axial direction (+Y direction) is generated by the elastic deformation of the fixing member 53, but the elastic force is sufficiently smaller than the elastic force in the other axial direction (−Y direction) applied to the cover member 60 by the elastic member 70. Therefore, even if the fixing member 53 is elastically deformed and the elastic force on the one axial direction is applied to the cover member 60, the cover member 60 is prevented from moving to the one side in the axial direction against the elastic force of the elastic member 70. As a result, the axial position of the cover member 60 and the axial position of the bus bar assembly 50 are prevented from deviating.

Next, the worker or the like fixes the substrate 80 in the substrate housing portion 37. At this time, the worker or the like makes the substrate connection portions 52Af, 52Bf, and 52Cf pass through the through holes 81a of the substrate 80. The worker or the like fixes the substrate connection portions 52Af, 52Bf, and 52Cf onto the substrate 80 by soldering. After connecting each of the substrate connection portions 52Af, 52Bf, and 52Cf to the substrate 80, the worker or the like fixes the substrate cover 32 to the upper side of the substrate housing portion 37 and closes the upper opening of the substrate housing portion 37.

Note that, in the present description, the term "worker or the like" includes a worker who performs each work, an assembling device, and the like. Each work may be performed only by a worker, may be performed only by an assembling device, or may be performed by a worker and an assembling device.

According to the present embodiment, the housing 30 has the connection hole 31b that connects the inside of the stator housing portion 35 and the inside of the substrate housing portion 37 in the radial direction. The bus bar assembly 50 having the bus bar 52 is passed through the connection hole 31b in the radial direction. The bus bar 52 includes the coil connection portions 52Ae, 52Be, and 52Ce electrically connected to the coil 42c in the stator housing portion 35, and the substrate connection portions 52Af, 52Bf, and 52Cf electrically connected to the substrate 80 in the substrate housing portion 37. As described above, in the present embodiment, the bus bar assembly 50 having the bus bar 52 connected to each of the coil 42c and the substrate 80 passes through the connection hole 31b. That is, it is not necessary to electrically connect the coil 42c and the substrate 80 by connecting the plurality of bus bar members with screws or the like. Therefore, since it is not necessary to configure one bus bar 52 with a plurality of bus bar members, the number of components of the rotary electric machine 10 can be reduced. In addition, the number of components of the pump 100 can be reduced. Therefore, the number of assembling steps of the rotary electric machine 10 and the number of assembling steps of the pump 100 can be reduced.

In addition, for example, in a case where a plurality of bus bar members are connected by screws to constitute a bus bar that connects the coil 42c and the substrate 80, the bus bar member disposed in the stator housing portion 35 from the opening 35a and the bus bar member disposed in the substrate housing portion 37 from the upper opening of the substrate housing portion 37 are connected. In this case, the positions of the two bus bar members are likely to be displaced from each other, and it may be difficult to fix the bus bar members to each other by screwing or the like. On the other hand, according to the present embodiment, it is not necessary to fix the bus bar members to each other by screwing or the like. Therefore, assembly workability of the rotary electric machine 10 can be improved. Further, assembly workability of the pump 100 can be improved.

According to the present embodiment, the bus bar assembly 50 includes the fixing member 53 which is held by the bus bar holder 51 and fixed to the housing 30. Therefore, the bus bar assembly 50 can be easily fixed to the housing 30 with high positional accuracy. As a result, the coil connection portions 52Ae, 52Be, and 52Ce and the substrate connection portions 52Af, 52Bf, and 52Cf in the bus bar 52 can be easily disposed with high positional accuracy. Therefore, the work of connecting the coil 42c and the coil connection portions 52Ae, 52Be, and 52Ce and the work of connecting the substrate 80 and the substrate connection portions 52Af, 52Bf, and 52Cf can be easily performed. Since the fixing member 53 separate from the bus bar 52 is fixed to the housing 30, it is possible to suppress deformation of the bus bar 52 even when a force is applied to the bus bar assembly 50. As a result, it is easy to suitably maintain the connection state between the coil 42c and the substrate 80 by the bus bar 52.

In addition, for example, in a case where a plurality of bus bar members are connected by screws to constitute a bus bar that connects the coil 42c and the substrate 80, the bus bar member disposed in the stator housing portion 35 from the opening 35a is held by a holder member fitted in the stator housing portion 35. In this case, it is necessary to connect the bus bar member and the lead wire 42f by passing the lead wire 42f of the coil 42c through a hole provided in the holder member. Therefore, there is a problem that the holder member is an obstacle and it is difficult to connect the bus bar member and the lead wire 42f.

On the other hand, according to the present embodiment, the bus bar 52 is configured to pass through the connection hole 31b together with the bus bar assembly 50. Therefore, a holder member fitted in the stator housing portion 35 is not provided. As a result, after the bus bar assembly 50 is inserted into the connection hole 31b, the connection work between the coil connection portions 52Ae, 52Be, and 52Ce and the lead wire 42f can be easily performed through the opening 35a. Therefore, the connection work between the coil connection portions 52Ae, 52Be, and 52Ce and the coil 42c can be easily performed.

According to the present embodiment, the coil connection portions 52Ae, 52Be, and 52Ce overlap the opening 35a when viewed from one side in the axial direction. Therefore, the connection work between the coil connection portions 52Ae, 52Be, and 52Ce and the lead wire 42f can be more easily performed through the opening 35a.

According to the present embodiment, the rotary electric machine 10 includes the cover member 60 having the cylindrical portion 61 surrounding the end portion on one side in the axial direction of the stator 42. Therefore, even when the bus bar assembly 50 is configured to pass through the connection hole 31b, the end portion on one side in the axial direction of the stator 42 can be insulated from the housing 30 by the cover member 60. In addition, the cover member 60 has the opposing portion 62 located on one side in the axial direction of the bus bar assembly 50 in the stator housing portion 35. The opposing portion 62 has the axial positioning portion 62d that axially positions the bus bar assembly 50. Therefore, the bus bar assembly 50 can be positioned in the axial direction by the cover member 60. As a result, the coil connection portions 52Ae, 52Be, and 52Ce and the substrate connection portions 52Af, 52Bf, and 52Cf in the bus bar 52 can be easily disposed with high positional accuracy. Therefore, the work of connecting the coil 42c and the coil connection portions 52Ae, 52Be, and 52Ce and the work of connecting the substrate 80 and the substrate connection portions 52Af, 52Bf, and 52Cf can be easily performed. Since the bus bar assembly 50 can be positioned in the axial direction using the cover member 60 that insulates between the stator 42 and the housing 30, it is possible to suppress an increase in the number of components of the rotary electric machine 10 as compared with a case where a positioning member is separately provided.

According to the present embodiment, the rotary electric machine 10 includes the elastic member 70 that is located between the lid member 33 and the cover member 60 in the axial direction and applies a force toward the other axial direction to the cover member 60. Therefore, the cover member 60 can be pressed in the axial direction by the elastic member 70. Accordingly, the cover member 60 and the bus bar assembly 50 can be prevented from being displaced in the axial direction. In addition, since the elastic member 70 is a leaf spring as in the present embodiment, it is easy to increase the elastically deformable axial distance of the elastic member 70 and to reduce the degree of change in the elastic force with respect to the change in the amount of elastic deformation. As a result, even if variation occurs in the amount of elastic deformation of the elastic member 70 in the axial direction due to variation in the distance in the axial direction between the lid member 33 and the cover member 60, variation in the elastic force applied from the elastic member 70 to the cover member 60 can be suppressed to be relatively small. Therefore, regardless of variations in the axial distance between the lid member 33 and the cover member 60, the cover member 60 and the bus bar assembly 50 can be suitably pressed in the axial direction by the elastic member 70.

According to the present embodiment, the coil connection portions 52Ae, 52Be, and 52Ce have a U shape sandwiching the lead wire 42f drawn out from the coil 42c when viewed in the axial direction. Therefore, in a state where the lead wire 42f is sandwiched and held by the coil connection portions 52Ae, 52Be, and 52Ce, the connection work between the coil connection portions 52Ae, 52Be, and 52Ce and the lead wire 42f can be performed. Therefore, the connection work between the coil connection portions 52Ae, 52Be, and 52Ce and the coil 42c can be more easily performed.

According to the present embodiment, the coil connection portion 52Ae includes the first holding portion 52g connected to the bus bar body portion 52Am and the second holding portion 52h that sandwiches the lead wire 42f between the first holding portion 52g and the second holding portion 52h. The second holding portion 52h is located radially inside the first holding portion 52g. Therefore, the opening of the U-shaped coil connection portion 52Ae is disposed radially inward. As a result, the lead wire 42f drawn out from the coil 42c can be hooked and sandwiched by the coil connection portion 52Ae from the radially inner side. Therefore, the lead wire 42f can be easily held by the coil connection portion 52Ae. Therefore, the connection work between the coil connection portion 52Ae and the coil 42c can be more easily performed. The same applies to the coil connection portions 52Be and 52Ce.

According to the present embodiment, the plurality of bus bars 52 include the bus bars 52A and 52B in which the coil connection portions 52Ae and 52Be are open to the upper side in the vertical direction Z. Therefore, it is easy to maintain the lead wire 42f held by the coil connection portions 52Ae and 52Be in the coil connection portions 52Ae and 52Be using gravity. As a result, the connection work between the coil connection portions 52Ae and 52Be and the coil 42c can be more easily performed.

According to the present embodiment, the substrate housing portion 37 includes the second fixed portion 37b to which the fixing member 53 is fixed. Therefore, the bus bar assembly 50 inserted into the connection hole 31b from the opening of the substrate housing portion 37 can be fixed to the second fixed portion 37b in the substrate housing portion 37 from the opening of the substrate housing portion 37. As a result, the work of fixing the bus bar assembly 50 to the housing 30 can be easily performed.

According to the present embodiment, the fixing member 53 is fixed to the second fixed portion 37b by the screw 92 tightened from the radially outside. Therefore, the fixing member 53 can be more easily and firmly fixed to the housing 30 via the opening of the substrate housing portion 37.

According to the present embodiment, the elastic member 70 includes the held portion 71 held on one side in the axial direction of the opposing portion 62 and the contact portion 72 connected to the held portion 71 and coming into contact with the lid member 33 from the other side in the axial direction. Therefore, the elastic member 70 can be held by the cover member 60. As a result, it is possible to suppress the displacement of the position of the elastic member 70 in the stator housing portion 35. Therefore, the state in which the elastic force is applied to the cover member 60 by the elastic member 70 can be suitably maintained.

According to the present embodiment, the cover member 60 has the claw portion 64 hooked to the held portion 71 from one side in the axial direction. Therefore, the claw portion 64 can suitably prevent the elastic member 70 from being detached from the cover member 60 to one side in the axial direction. As a result, even when the rotor 41 is disposed in the stator housing portion 35 after the elastic member 70 is held by the cover member 60 in the stator housing portion 35, the elastic member 70 can be suppressed from being detached from the cover member 60 by a magnetic force of the rotor magnet of the rotor 41. Therefore, assembly workability of the rotary electric machine 10 can be further improved.

According to the present embodiment, the opposing portion 62 has the hole 62c as a radial positioning portion for radially positioning the bus bar assembly 50. Therefore, the bus bar assembly 50 can be positioned in the radial direction by the cover member 60. As a result, the coil connection portions 52Ae, 52Be, and 52Ce and the substrate connection portions 52Af, 52Bf, and 52Cf in the bus bar 52 can be disposed with higher positional accuracy. Therefore, the work of connecting the coil 42c and the coil connection portions 52Ae, 52Be, and 52Ce and the work of connecting the substrate 80 and the substrate connection portions 52Af, 52Bf, and 52Cf can be more easily performed.

According to the present embodiment, the radial positioning portion is the hole 62c that penetrates the opposing portion 62 in the axial direction. The bus bar assembly 50 has the protruding portion 56 that passes through the hole 62c from the other side in the axial direction. Therefore, the radial positioning of the bus bar assembly 50 can be easily performed by making the protruding portion 56 pass through the hole 62c. Further, since the protruding portion 56 and the hole 62c are hooked, it is possible to prevent the bus bar assembly 50 and the cover member 60 from relatively rotating in the circumferential direction.

According to the present embodiment, the axial positioning portion 62d is a peripheral edge portion of the hole 62c in the opposing portion 62, and is in contact with the bus bar assembly 50 from one side in the axial direction. Therefore, the axial positioning portion 62d can be formed by forming the hole 62c which is the radial positioning portion. As a result, the cover member 60 can be easily manufactured as compared with a case where the axial positioning portion 62d is formed at a location different from the hole 62c. Further, the bus bar assembly 50 can be positioned in the radial direction and the bus bar assembly 50 can be positioned in the axial direction by bringing the protruding portion 56 into contact with the bus bar assembly 50 and the opposing portion 62 through the hole 62c, and the bus bar assembly 50 can be positioned in the axial direction. Therefore, it is easy to position the bus bar assembly 50 in both the axial direction and the radial direction by the cover member 60.

According to the present embodiment, the bus bar assembly 50 is in contact with the stator 42 from one side in the axial direction. Therefore, the bus bar assembly 50 can be positioned by being sandwiched between the stator 42 and the cover member 60 in the axial direction. As a result, the bus bar assembly 50 can be positioned in the axial direction with higher accuracy. Therefore, the work of connecting the coil 42c and the coil connection portions 52Ae, 52Be, and 52Ce and the work of connecting the substrate 80 and the substrate connection portions 52Af, 52Bf, and 52Cf can be more easily performed.

According to the present embodiment, the cylindrical portion 61 surrounds the coil end 42g. Therefore, the coil end 42g can be prevented from coming into contact with the housing 30. In addition, the end portion on the other side in the axial direction of the cylindrical portion 61 faces one side in the axial direction of the stator core 42a with a gap interposed therebetween. Therefore, it is possible to prevent the cover member 60 inserted into the stator housing portion 35 from butting against the stator core 42a before coming into contact with the bus bar assembly 50. As a result, the axial positioning portion 62d of the cover member 60 can be suitably brought into contact with the bus bar assembly 50 from one side in the axial direction. Therefore, the bus bar assembly 50 can be more suitably positioned in the axial direction by the cover member 60.

According to the present embodiment, the protruding portion 56 is thermally welded and fixed to the opposing portion 62. Therefore, relative movement of the bus bar assembly 50 and the cover member 60 in the axial direction can be suppressed. As a result, even if the cover member 60 butts against the stator core 42a from one side in the axial direction before the cover member comes into contact with the bus bar assembly 50 in the axial direction, the cover member 60 butts against the stator core 42a and is positioned in the axial direction, so that the bus bar assembly 50 can be indirectly positioned in the axial direction. In this case, the axial positioning portion of the cover member 60 is a portion of the opposing portion 62 where the protruding portion 56 is thermally welded.

According to the present embodiment, the cylindrical portion 61 is fitted to the inner peripheral surface of the stator housing portion 35. Therefore, the cylindrical portion 61 can be suppressed from moving in the radial direction in the stator housing portion 35. Accordingly, by radially positioning the bus bar assembly 50 by the hole 62c of the cover member 60, it is possible to suppress the movement of the bus bar assembly 50 in the radial direction more suitably.

According to the present embodiment, the cylindrical portion 61 includes the elastically deformable portion 63 that is elastically deformable in the radial direction. The elastically deformable portion 63 is pressed against the inner peripheral surface of the stator housing portion 35 from the radially inner side. Therefore, it is possible to suitably suppress rattling of the cylindrical portion 61 in the radial direction in the stator housing portion 35. In addition, the cylindrical portion 61 can be disposed with high axial accuracy with respect to the central axis J, and the positioning accuracy in the radial direction of the bus bar assembly 50 by the cover member 60 can be improved.

According to the present embodiment, the radially outer surface of the elastically deformable portion 63 has the inclined surface 63a positioned radially inward toward the other side in the axial direction. Therefore, when the cover member 60 is fitted into the stator housing portion 35, the inclined surface 63a comes into contact with the inner edge of the opening 35a and is pressed radially inward. As a result, the cover member 60 can be easily disposed in the stator housing portion 35 while the elastically deformable portion 63 is suitably elastically deformed radially inward.

According to the present embodiment, the lid member 33 includes the bearing holding cylinder 33b that holds the bearing 43a rotatably supporting the rotor 41. Therefore, it is possible to suppress an increase in the number of components of the rotary electric machine 10 as compared with a case where a member for holding the bearing 43a is separately provided. The bearing holding cylinder 33b is located radially inside the cylindrical portion 61. Therefore, the cover member 60 can be suitably disposed in the stator housing portion 35 while the bearing 43a is held by the lid member 33.

The present invention is not limited to the above-described embodiment, and other structures and other methods may be employed within the scope of the technical idea of the present invention. The bus bar assembly may have any configuration as long as the bus bar assembly includes a bus bar, a bus bar holder, and a fixing member, and the bus bar assembly passes through the connection hole in the radial direction. The bus bar and the fixing member may be held to the bus bar holder in any manner. The coil connection portion may not overlap the opening of the stator housing portion when viewed from one side in the axial direction. The shape of the coil connection portion is not particularly limited.

The fixing member may have any configuration as long as the fixing member is held by the bus bar holder and fixed to the housing. The fixing member may be fixed to the stator housing portion. The fixing member may not be a plate-shaped member. The fixing member may be fixed to the housing by a method other than screwing, for example, welding. The bus bar assembly may be in contact with the housing from one side in the axial direction. In this case, for example, the abutment portion 57 in the above-described embodiment may butt against a step or the like provided on the inner peripheral surface of the stator housing portion 35 from one side in the axial direction. The fixing member may not need to be provided.

The cover member may have any configuration as long as the cover member includes a cylindrical portion and an opposing portion located on one side in the axial direction of the bus bar assembly in the stator housing portion. The opposing portion may have any configuration as long as it has an axial positioning portion that axially positions the bus bar assembly. The opposing portion may not be annular. The axial positioning portion may have any configuration as long as the bus bar assembly can be positioned in the axial direction. When the cover member is fixed to the bus bar assembly as in the above-described embodiment, a portion of the cover member to which the bus bar assembly is fixed may be the axial positioning portion. The radial positioning portion may have any configuration as long as the bus bar assembly can be positioned in the radial direction. The radial positioning portion may not be provided. The cover member may not have the claw portion hooked from one side in the axial direction on the held portion held by the opposing portion of the elastic member. The cover member may not have the elastically deformable portion.

The elastic member may have any configuration as long as the elastic member is located between the lid member and the cover member in the axial direction and applies a force toward the other axial direction to the cover member. The elastic member may be a coil spring or a seal member that elastically deforms in the axial direction, such as an O-ring. The elastic member may not be provided.

The application of the rotary electric machine to which the present invention is applied is not particularly limited. The rotary electric machine may be mounted on a device other than the pump. The rotary electric machine is not limited to a motor, and may be a power generator. The application of the pump including the rotary electric machine is not particularly limited. The type of the fluid sent by the pump is not particularly limited, and may be water or the like. The rotary electric machine and the pump may be mounted on a device other than the vehicle. Each configuration and method described in this description can be combined as appropriate within a scope that does not give rise to mutual contraction.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A rotary electric machine comprising:
   a rotor rotatable about a central axis extending in an axial direction;
   a stator having a coil and facing the rotor via a gap;
   a substrate electrically connected to the coil;
   a bus bar assembly having a bus bar electrically connecting the coil and the substrate, and a bus bar holder holding the bus bar;
   a housing having a stator housing portion that accommodates the stator therein and a substrate housing portion that accommodates the substrate therein; and
   a cover member having a cylindrical portion surrounding an end portion of the stator on one side in an axial direction of the stator,
   wherein
   the substrate housing portion is located radially outside the stator housing portion,
   the housing has a connection hole that connects an inside of the stator housing portion and an inside of the substrate housing portion,
   the bus bar assembly is passed through the connection hole in a radial direction, and the bus bar includes:
 a coil connection portion electrically connected to the coil in the stator housing portion; and
 a substrate connection portion electrically connected to the substrate in the substrate housing portion,
the bus bar assembly is located on one side in the axial direction of the stator in the stator housing portion,
the stator housing portion has an opening that opens to one side in the axial direction of the stator,
the housing includes a lid member that closes the opening,
the cover member has an opposing portion located on one side in the axial direction of the bus bar assembly in the stator housing portion, and
the opposing portion has a portion that axially positions the bus bar assembly, and
wherein the rotary electric machine further comprises
an elastic member that is located between the lid member and the cover member in the axial direction and applies a force toward the other side in the axial direction of the stator to the cover member.

2. The rotary electric machine according to claim 1, wherein
the elastic member includes:
 a held portion that is held on one side in the axial direction of the opposing portion; and
 a contact portion that is connected to the held portion and is in contact with the lid member from the other side in the axial direction of the stator.

3. The rotary electric machine according to claim 2, wherein the cover member has a claw portion hooked to the held portion from one side in the axial direction.

4. The rotary electric machine according to claim 1, wherein the opposing portion has a portion that radially positions the bus bar assembly.

5. The rotary electric machine according to claim 4, wherein the portion that radially positions the bus bar assembly is a hole penetrating the opposing portion in the axial direction, and the bus bar assembly has a protruding portion that is passed through the hole from the other side in the axial direction of the stator.

6. The rotary electric machine according to claim 5, wherein the portion that axially positions the bus bar assembly is a peripheral edge portion of the hole in the opposing portion, and is in contact with the bus bar assembly from one side in the axial direction.

7. The rotary electric machine according to claim 1, wherein the bus bar assembly is in contact with the stator or the housing from one side in the axial direction.

8. The rotary electric machine according to claim 7, wherein
the stator includes a stator core fixed in the stator housing portion,
the coil includes a coil end protruding to one side in the axial direction from the stator core,
the cylindrical portion surrounds the coil end, and
an end portion on an other side in the axial direction of the cylindrical portion faces one side in the axial direction of the stator core with a gap interposed therebetween.

9. The rotary electric machine according to claim 1, wherein the cylindrical portion is fitted to an inner peripheral surface of the stator housing portion.

10. The rotary electric machine according to claim 9, wherein
the cylindrical portion includes an elastically deformable portion that is elastically deformable in a radial direction, and
the elastically deformable portion is pressed against an inner peripheral surface of the stator housing portion from a radially inner side.

11. The rotary electric machine according to claim 1, wherein
the lid member includes a bearing holding cylinder that holds a bearing that rotatably supports the rotor, and
the bearing holding cylinder is located radially inside the cylindrical portion.

12. A pump comprising:
the rotary electric machine according to claim 1; and
a pump mechanism connected to the rotor.

* * * * *